(12) United States Patent
Clee et al.

(10) Patent No.: US 9,501,757 B2
(45) Date of Patent: Nov. 22, 2016

(54) IDENTIFYING REMOTE OBJECTS ON A CLIENT SYSTEM

(75) Inventors: Scott John Clee, Winchester (GB); Peter Brian Masters, Fareham (GB); Daniel Edward Would, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2290 days.

(21) Appl. No.: 11/462,059

(22) Filed: Aug. 3, 2006

(65) Prior Publication Data

US 2007/0183389 A1 Aug. 9, 2007

(30) Foreign Application Priority Data

Aug. 4, 2005 (GB) .................................... 0516015.5

(51) Int. Cl.
G06Q 10/10 (2012.01)
G06F 3/0481 (2013.01)

(52) U.S. Cl.
CPC ............. *G06Q 10/10* (2013.01); *G06F 3/0481* (2013.01)

(58) Field of Classification Search
CPC ............. G06F 3/0481; G06F 3/04842; A63F 2300/1025; H04L 67/38; H04N 9/28
USPC ......... 709/202, 203, 204, 217; 715/751, 753
See application file for complete search history.

(56) References Cited

U.S. PATENT DOCUMENTS

| | | | |
|---|---|---|---|
| 5,600,776 A * | 2/1997 | Johnson et al. .............. | 715/733 |
| 5,600,778 A | 2/1997 | Swanson et al. | |
| 5,603,034 A | 2/1997 | Swanson | |
| 5,673,403 A | 9/1997 | Brown et al. | |
| 5,793,368 A | 8/1998 | Beer | |
| 5,857,189 A * | 1/1999 | Riddle ............................ | 707/10 |
| 6,175,362 B1 * | 1/2001 | Harms ............... | H04N 5/44543 348/563 |
| 6,188,399 B1 | 2/2001 | Voas et al. | |
| 6,557,164 B1 * | 4/2003 | Faustini ........................ | 717/107 |
| 6,654,034 B1 | 11/2003 | Kanevsky | |
| 6,693,647 B1 * | 2/2004 | Bernard et al. ............... | 715/700 |
| 6,731,310 B2 | 5/2004 | Craycroft et al. | |
| 6,762,767 B2 * | 7/2004 | Evans ................... | G06F 9/4443 345/581 |
| 7,027,172 B1 * | 4/2006 | Parulski et al. ............. | 358/1.15 |
| 7,032,180 B2 * | 4/2006 | Wilkinson ........... | G06F 9/4443 715/210 |
| 7,197,702 B2 * | 3/2007 | Niyogi ................ | G06F 17/2247 709/203 |
| 7,523,112 B2 * | 4/2009 | Hassan et al. ................... | 707/10 |
| 7,721,223 B2 * | 5/2010 | Ben-Shachar et al. ....... | 715/790 |
| 7,996,472 B2 * | 8/2011 | Koch et al. .................... | 709/206 |
| 8,370,420 B1 * | 2/2013 | Decasper .......... | G06F 17/30902 709/202 |
| 2003/0056026 A1 * | 3/2003 | Anuff .................. | G06F 17/3089 719/316 |
| 2003/0146934 A1 * | 8/2003 | Bailey ....................... | G06F 8/38 715/765 |
| 2003/0184584 A1 * | 10/2003 | Vachuska .............. | G06F 9/4443 715/762 |

(Continued)

*Primary Examiner* — Sargon Nano
(74) *Attorney, Agent, or Firm* — Lee Law, PLLC; Christopher B. Lee

(57) ABSTRACT

A method and system for identifying remote objects on a client system is provided. A client system (101) has a connection means (302) to access a component (310) on a remote system (103). The client system (101) has a graphical user interface (308) including a user interface object (306) representing the component (310) at the remote system (103). Means (304) are provided for applying a theme to the object (306) to distinguish it as representing a remote component (310). The graphical user interface (308) also includes user interface objects (307) for components local to the client system (101), and the means for applying a theme (304) applies distinguishing themes to the local objects (307) and the remote objects (306).

22 Claims, 4 Drawing Sheets

(56) References Cited

U.S. PATENT DOCUMENTS

| | | | |
|---|---|---|---|
| 2003/0184590 A1* | 10/2003 | Will | G06F 3/14 715/781 |
| 2004/0088377 A1* | 5/2004 | Henriquez | 709/219 |
| 2004/0119757 A1 | 6/2004 | Corley et al. | |
| 2004/0189439 A1* | 9/2004 | Cansino | 340/5.2 |
| 2005/0038868 A1* | 2/2005 | Spicer | 709/217 |
| 2005/0097478 A1* | 5/2005 | Killian et al. | 715/851 |
| 2005/0187971 A1* | 8/2005 | Hassan et al. | 707/104.1 |
| 2005/0240983 A1* | 10/2005 | Peters | 726/1 |
| 2005/0268279 A1* | 12/2005 | Paulsen et al. | 717/110 |
| 2006/0059431 A1* | 3/2006 | Pahud | 715/751 |
| 2006/0080171 A1* | 4/2006 | Jardins et al. | 705/14 |
| 2006/0080639 A1* | 4/2006 | Bustelo et al. | 717/111 |
| 2006/0085754 A1* | 4/2006 | Li | G06F 9/4443 715/763 |
| 2006/0122955 A1* | 6/2006 | Bethlehem et al. | 707/1 |
| 2006/0168136 A1* | 7/2006 | Bethlehem et al. | 709/219 |
| 2006/0271637 A1* | 11/2006 | McKeon | H04L 67/08 709/217 |

\* cited by examiner

IDENTIFYING REMOTE OBJECTS ON A CLIENT SYSTEM

This invention relates to the field of identifying remote user interface objects on a computer system and, in particular, to distinguishing remote objects by themes.

The act of working on a remote system usually involves having at least two computer systems connected remotely via a network, a client system (client) and a server system (server). The client communicates with the server using a protocol (for example, as TCP/IP) and a service (for example, telnet, rlogin, X11 etc.). The service provides the user with a terminal which appears to be running directly on the server. In reality, only commands or key/mouse presses are communicated across to the server from the client.

A client may use a windowing environment with multiple windows provided by a graphical user interface (GUI) on a display screen. Some of the windows will represent components, for example, applications, data, etc. which are local to the client system. Other windows may represent a remote connection to a component on a server system.

In a mismanaged windowing environment, a user can easily make the mistake of thinking a window is running locally when it is actually running remotely. In this scenario, an operation by mistake on a remote system can have serious consequences. For example, the press of the delete key can be fateful, especially if the remote system is a production system. Additionally, a user may be communicating with more than one remote system and the control of the situation can easily be lost.

To aid users in determining which system they are currently working on services such as rlogin (Remote Login) and ssh (Secure Shell) modify the command prompt in a terminal as follows:
1. Default command prompt: "[user@local-machine user]$"
2. After connecting using ssh: "[user@remote-machine user]$"
3. Then switching to the root userid: "[root@remote-machine user]$"

After connecting to the remote system, the command prompt shows the system name. Additionally after switching to the root userid the current user text is also changed to show the new user (as seen in Example 3.). The last item in the text is the current directory.

This facility provides the user with a convenient way of distinguishing what system owns a given terminal. However, the text in the command prompt can be manually overridden and, if this is done, the user may no longer have the means of distinguishing this information.

The above example is associated with most terminal based remote connection applications. However, this is not guaranteed and is dependent on the developer of the application to provide this as a feature.

When considering more window-based remote connection applications, there is no common feature like the one above and it is dependent on the developer to introduce a means of knowing what system the application is running on. This may be done by including the relevant information in the title bar text of the window or in a specific information panel in the application itself. Again, such features are optional and not guaranteed.

With services such as the X11 system On Linux™ the user has even more power with the ability to run any X11 window based application via a remote connection. Linux is a trademark of Linus Torvalds in the United States, other countries or both. This means the user has the power to run applications that were not designed or even considered to run remotely. In this case, the application does not have any means of distinguishing the fact that it is running on a remote system.

An aim of this invention is to enable the distinguishing of user interface objects by themes to provide a mechanism for easily identifying objects that represent components running on remote systems.

According to a first aspect of the present invention there is provided a method for identifying remote user interface objects on a client system comprising: establishing a connection at a client system to a remote system to access a component on the remote system; providing a user interface object at the client system representing the component on the remote system; and applying a theme to the object, the theme distinguishing the object as representing a remote component.

The method may include applying a theme to user interface objects at the client system for components local to the client system, wherein themes for local and remote components are distinguished.

The theme distinguishing the object as representing a remote component may represent, for example: one or more remote systems, a type of remote system, a type of component on a remote system, a type of operating system, a sub-network of remote systems, or a physical location of a remote system.

A theme may have a plurality of aspects and each aspect may represent a feature of a component. For example, a theme may have a hierarchy of aspects representing features of a component. A group of components may have a common theme in the form of a colour applied to the object and an individual component within the group may be represented by a shade of the colour. The user interface object may be a window object.

The method may include determining details of the connection to the remote system and determining the theme based on the details.

The component on the remote system may be, for example: an application, a database, a service, files, data, or documents.

The theme may include control features based on the type of component on the remote system.

According to a second aspect of the present invention there is provided a system for identifying remote objects on a client system comprising: a client system having a graphical user interface; a connection means at a client system to access a component on a remote system; the graphical user interface of the client system including an object representing the component on the remote system; and means for applying a theme to the object, the theme distinguishing the object as representing a remote component.

The graphical user interface may include objects for components local to the client system, wherein the means for applying a theme applies distinguishing themes to the local objects and the remote objects.

The graphical user interface may be a window-based interface.

The means for applying a theme may include means for creating and modifying themes. The means for applying a theme may also include means for determining details of the connection to the remote system and means for determining the theme based on the details.

According to a third aspect of the present invention there is provided a computer program product stored on a computer readable storage medium, comprising computer readable program code means for performing the steps of: establishing a connection at a client system to a remote system to access a component on the remote system; providing a user interface object at the client system representing the component on the remote system; and applying a theme to the object, the theme distinguishing the object as representing a remote component.

Embodiments of the present invention will now be described, by way of examples only, with reference to the accompanying drawings in which.

A user of a client system may access components such as applications, services or data on one or more remote computer system using a user interface on the client system. The described method and system provide a means of distinguishing user interface objects representing remote components.

Figure 1:
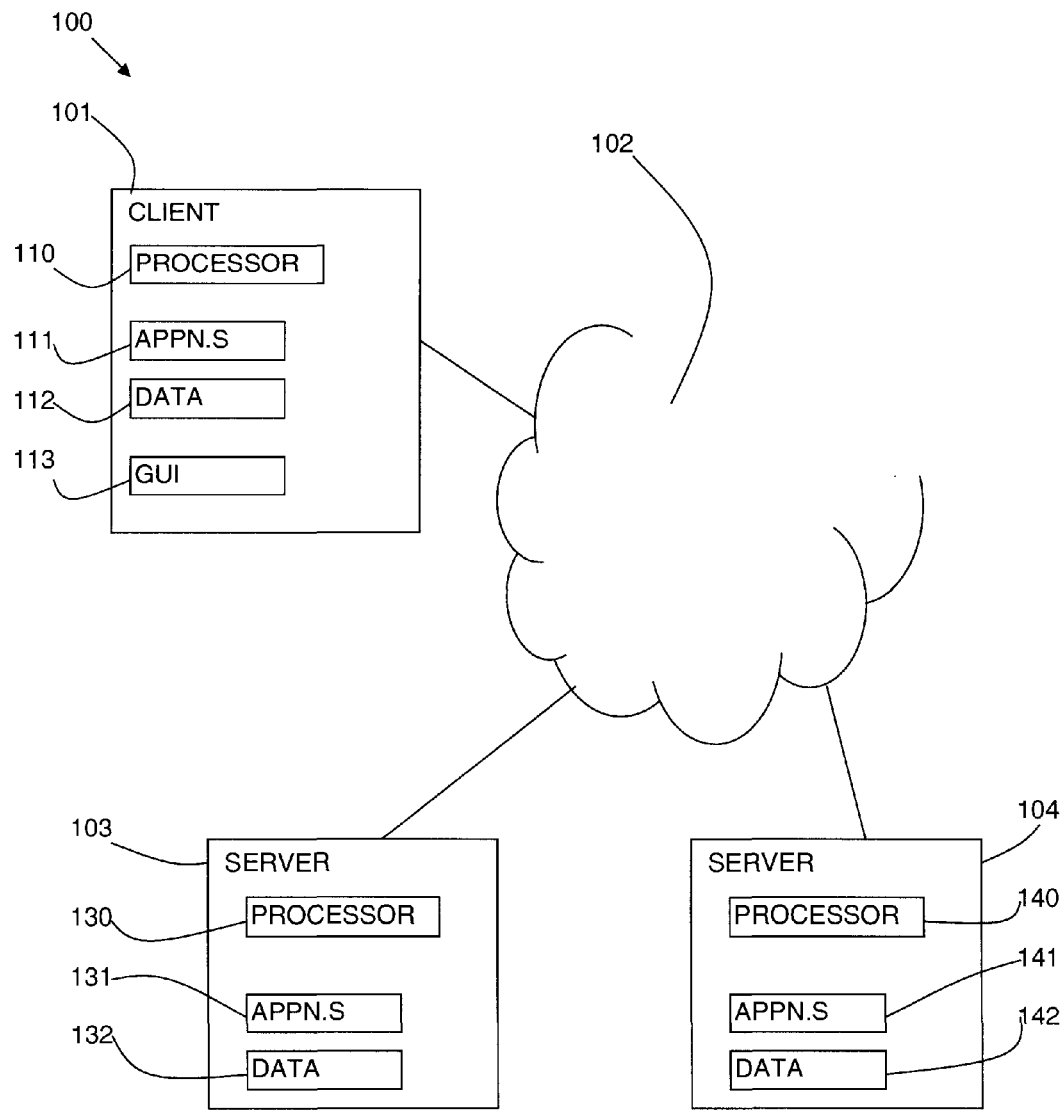
FIG. 1 is a block diagram of a client and server system in which the present invention may be implemented.

Referring to FIG. 1, a simple exemplary computer system 100 is shown with a client system 101 connected to a network 102 via which it can access one or more remote systems 103, 104. The client system 101 has a processor 110, applications 111 and data 112 local to the client system 101. Similarly, the remote systems 103, 104 each have processors 130, 140, applications 131, 141 and data 132, 142 local to the remote systems 103, 104. For example, the remote systems 103, 104 may be server systems.

The client system 101 includes means for accessing components running on the remote systems 103, 104.

The client system 101 communicates with a remote system 103, 104 using a protocol (for example, TCP/IP) and a remote access service. Examples of remote access services include the following.

Telnet allows access to a remote host computer by authorised users and to interact as though the user were physically at the host computer. It is a user command interface and an underlying TCP/IP protocol for accessing remote computers. With Telnet, a user logs on as a user of the host computer with privileges to the specific application and data on the host computer. Once logged into the host computer, the user can do anything the host has given permission for including reading, editing and deleting files.

Rlogin (remote login) is a UNIX command allowing an authorised user to login to other UNIX machines (host computers) on a network. (UNIX is a registered trademark of The Open Group in the United States or other countries.

Secure Shell (SSH) is a Unix-based command interface and protocol for securely getting access to a remote computer. It is widely used by network administrators to control Web and other kinds of servers remotely.

X-server is a TCP/IP based network window system which allows an application to use a display on a different remote computer. X11 is the widely-implemented window system.

VNC (Virtual Network Computing) is a remote display system which allows a user to view a computing desktop environment from anywhere on the Internet.

The above are examples of remote access services which can be operated via a client system remote from the host system on which the component is provided.

The client system 101 has a graphical user interface (GUI) 113 which allows the user to interact with the computer system 100 by inputting commands and data and receiving results. The GUI 113 provides user interface objects enabling the user to operate on the components of the computer system 100.

In a windowing environment, the GUI 113 provides a desktop including objects in the form of windows. A window represents a component, for example, an application, service, database, data, files, documents, etc. The component represented by the window can be operated on by the user. The format of a display of a window can be controlled by the user.

Multiple windows can be active at once and can be titled, overlaid or cascading enabling the user to see more than one window at a time. To make an input, a mouse click on the relevant window makes it the foreground process which can then be operated on using the input/output devices of the client system 101.

A client system 101 which includes means for accessing remote systems 103, 104 may have windows representing components running locally on the client system 101 and windows representing components running on the remote systems 103, 104.

The remote access service provides the user with a terminal display embodied by a user interface object which appears to be running on the remote system.

A client system 101 connected to a remote system 103, 104 with a user interface object representing component running on a remote system 103, 104, has a theme applied to the object allowing it to be distinguishable as representing a remote component. The expression user interface object is used to include a window, an application icon, a minimized window, a toolbar, or another form of terminal display. For each different combination of user and component on a remote system, a different theme can be applied.

Themes can include any form of identifying means. For example, themes may include any combination of the following modifications to the interface display.

Displaying connection details as part of a title bar text.

Changing the font/size/colour of a title bar text and/or any text within the application itself.

Changing the colour of the a bar.

Changing the colour of a surrounding window frame.

Changing the colour of a drop down windowing menu button which is generally located in the top left corner of the window.

Changing the colour of window control buttons (close, maximize, minimize) which are generally located in the top right corner of a window.

Changing the colour of resizing buttons which are generally located at one or more corners of a window.

Appending another option to the applications menu bar providing the ability to view connection details.

Modifying the style/behaviour of the caret.

Including connection information in any hover help which can be viewed by hovering over a window area (not including the actual application area within the window).

Play a sound byte.

Upon selection of a window or moving the mouse cursor over it, temporarily modifying (in real time) the content/style of the title bar.

Where relevant, any combination of the above applied to a window's icon which is usually located in a task bar in the windowing area.

Figure 2:
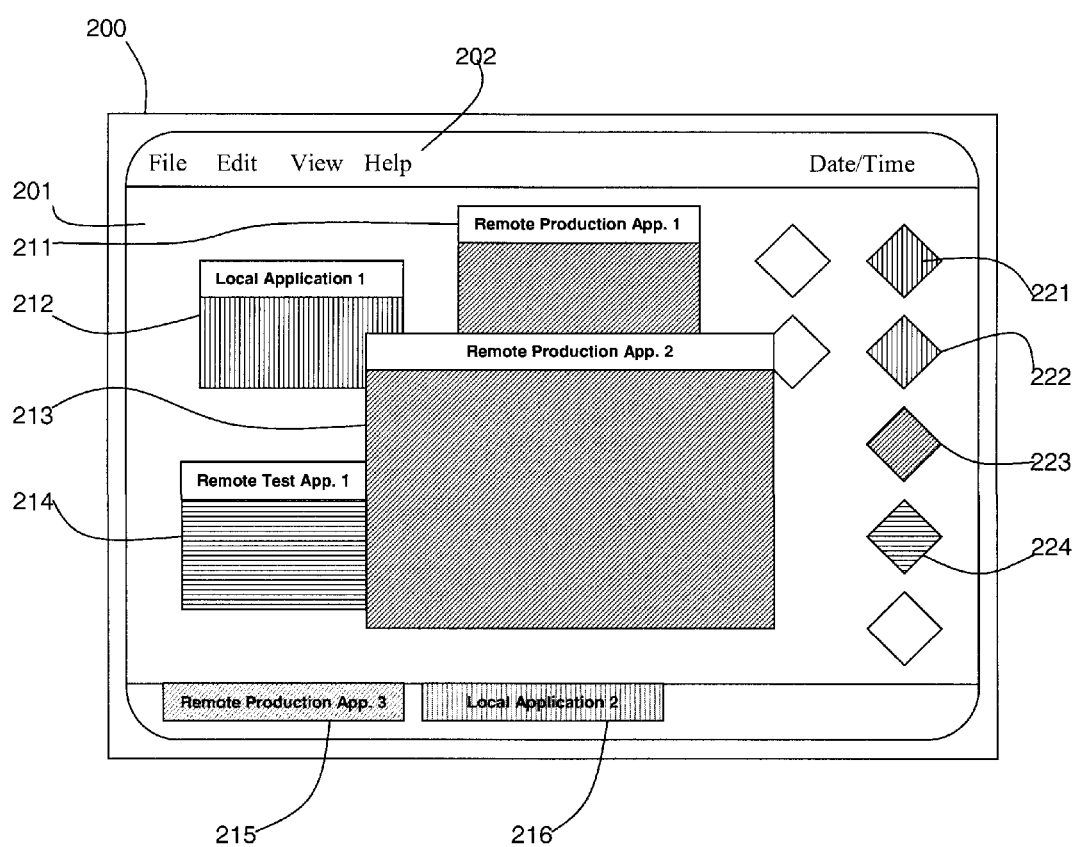
FIG. 2 is a schematic representation of a display screen of a client system in accordance with the present invention.

FIG. 2 shows an exemplary embodiment in the form of a windows-based environment displayed on a display screen 200 of a client system. The GUI enables a windows-based environment with a desktop 201 with a main toolbar 202 and icons 221-224 for applications and data available to the user. Four active windows 211-214 are shown with one of the windows being in the foreground 213 on which the user may be working. The other three windows 211, 213, 214 are in the background but can provide output to the user.

One of the windows 212 is for an application local to the client system and this window 212 has a first theme shown in vertical shading. The other three windows 211, 213, 214 are for applications remote from the client system. Two of the windows 211, 213 have a second theme shown by diagonal shading and the other window 214 has a third theme shown by horizontal shading. The second and third themes may be used to show different types of remote application. For example, in FIG. 2, the second theme is used for remote production applications 211, 213 and the third theme is used for remote test applications 214.

In addition to the themes of the windows 211-214, the themes can be applied to minimized windows 215, 216 and also to desktop icons 221-224.

Themes for remote components can be grouped in various ways. Components on remote systems can be grouped by any combination of Hostname, IP, subnet, OS, physical location etc. Grouping in this way has the added benefit, should multiple systems become unresponsive, of quickly identifying if the multiple systems are in the same group, for example, an event effecting a specific subnet.

Grouping applications leads to inherited themes. A group is identified by a particular theme element or a combination of multiple theme elements. Each remote system in a group may apply an offset to the theme element(s) allowing the remote system to distinguish itself uniquely yet still indicate it is a member of a given group. The most likely application of the offset is a coloured theme element. For example, a chosen group may have the colour green and all systems in that group use alternative shades of green.

In an example implementation, the IP address of the remote system can be used to identify it as a production or test system. This can be used to create a top level theme of red or green title bar respectively. The specific application name may be used to create a further grouping. For example: a blue window border may represent administrative consoles for configuring running systems; a white border may indicate editors; and a yellow border may indicate a terminal. Thus, multiple windows can be visually grouped either by their type of application or by their host systems or both.

In addition, an event (such as a button press) may also temporarily modify the position/size of the windows such that they are arranged/tiled according to their grouping. Upon releasing the button (or the firing of an end event) the windows return to their original size/location.

The advantage of using any of the above is that the user has the ability to distinguish which system/group a component is actually running on or communicating with.

Figure 3:
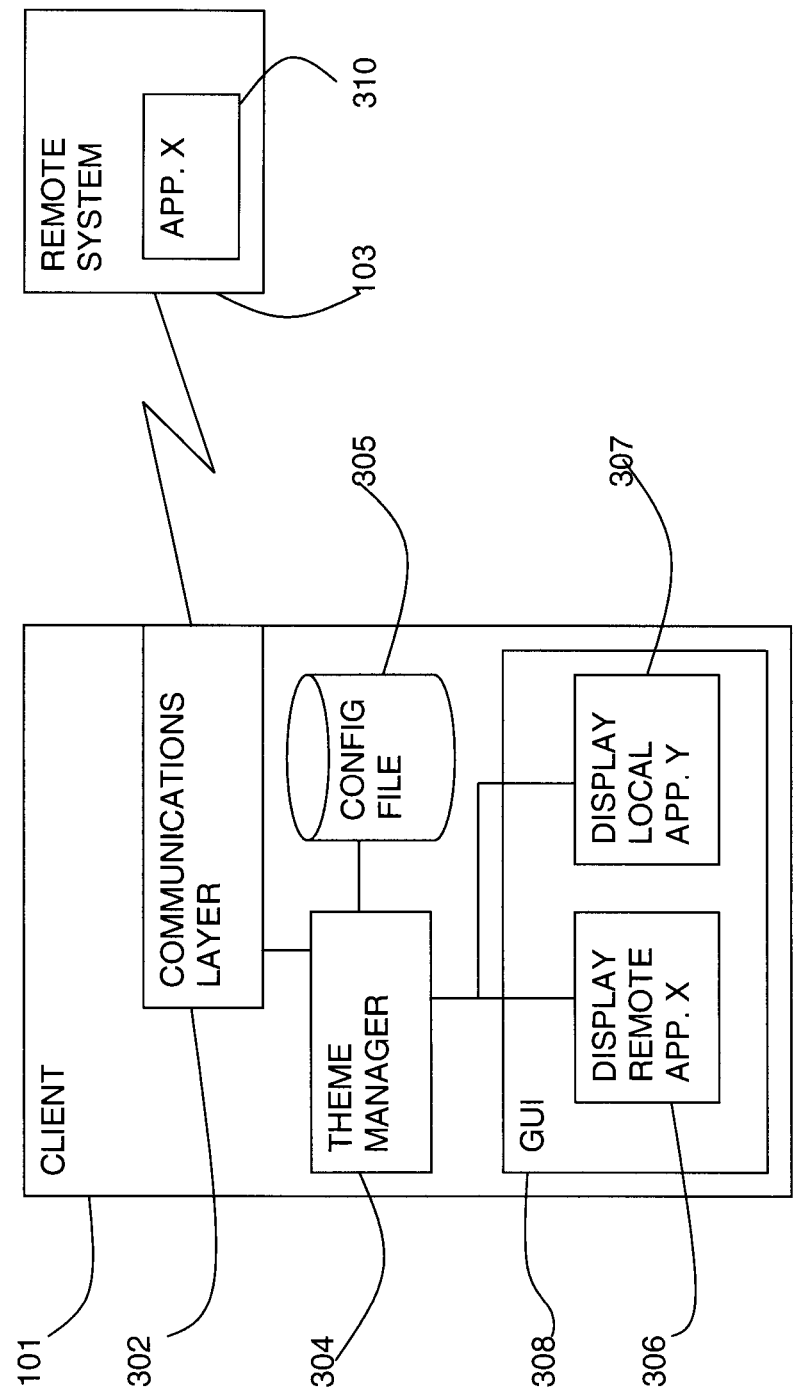
FIG. 3 is a block diagram of a computer system in accordance with the present invention.

Referring to FIG. 3, a client system 101 is shown in which a communication layer 302 communicates with a remote system 103. A theme manager 304 is provided on the client system 101 which applies a theme to a user interface object 306, 307 provided by a GUI 308. The theme manager 304 has a configuration file 305 which stores theme attributes.

In an exemplary embodiment shown in FIG. 3, a component in the form of an application 310 runs on the remote system 103 and is accessed by the client system 101. The theme manager 304 applies the theme attributes retrieved from the configuration file 305 to the user interface object 306 at the client system 101 for the remote application 310. The theme manager 304 applies the theme attributes in accordance with information regarding the remote application 310 provided by the communication layer 302.

The theme manager 304 also applies theme attributes retrieved from the configuration file 305 for the user interface object 307 for local applications.

The theme manager 304 provides menu options for a user. For example, a window menu may be provided for the theme manager alongside options such as minimize/maximize, etc.

An example implementation is described using the X11 example on Linux. The theme manager 304 is provided alongside the communications layer 302 of the X11 server running on the client system 101. When a request for an application window comes in, the theme manager 304 determines which remote system 103 (and possibly the user/IP/subnet/OS/location etc.) the application 310 is coming from. The theme manager 304 looks up in a configuration file 305 the necessary theme modifications that apply to that combination. When displaying the user interface object 306, the theme manager 304 overrides the default display theme options with the ones retrieved in the lookup. The result is an object 306 on screen with the chosen theme modifications applied for the remote system 103.

In an X11 environment, the configuration 305 is held in text files, as is common to UNIX systems. Upon receiving a remote connection the theme manager 304 would first discover the IP of the incoming connection and use this to perform a local or remote lookup to discover other information about the connecting system. Having found these details, the theme manager 304 can use them to enquire the theme overrides that apply to this setup combination. Firstly details would be applied at the most specific level, then combining them with group details etc. and move up the chain of hierarchy until a final theme setup is defined, this theme is then applied to the display.

In an example embodiment, if the remote component is an application in the form of one of (gedit, kedit, kate, write) then the application group is "Editor". "Editor" group specifies the override on the default theme:

Border.colour=white.

The host IP is then considered and found to be one of (192.168.10.n, 192.168.11.n) which is the subnet group "MainSiteBuilding3". This group overrides the title bar text with the option:

Titlebar.text.append="MainSiteBuilding3"

The specific IP is found to be 192.168.10.31 which is in the group "TestSystems" which specifies the override on the default theme: Titlebar.colour=Green It can be seen how each level, may change attributes from the default and append or overwrite attributes from other groups.

Figure 4:
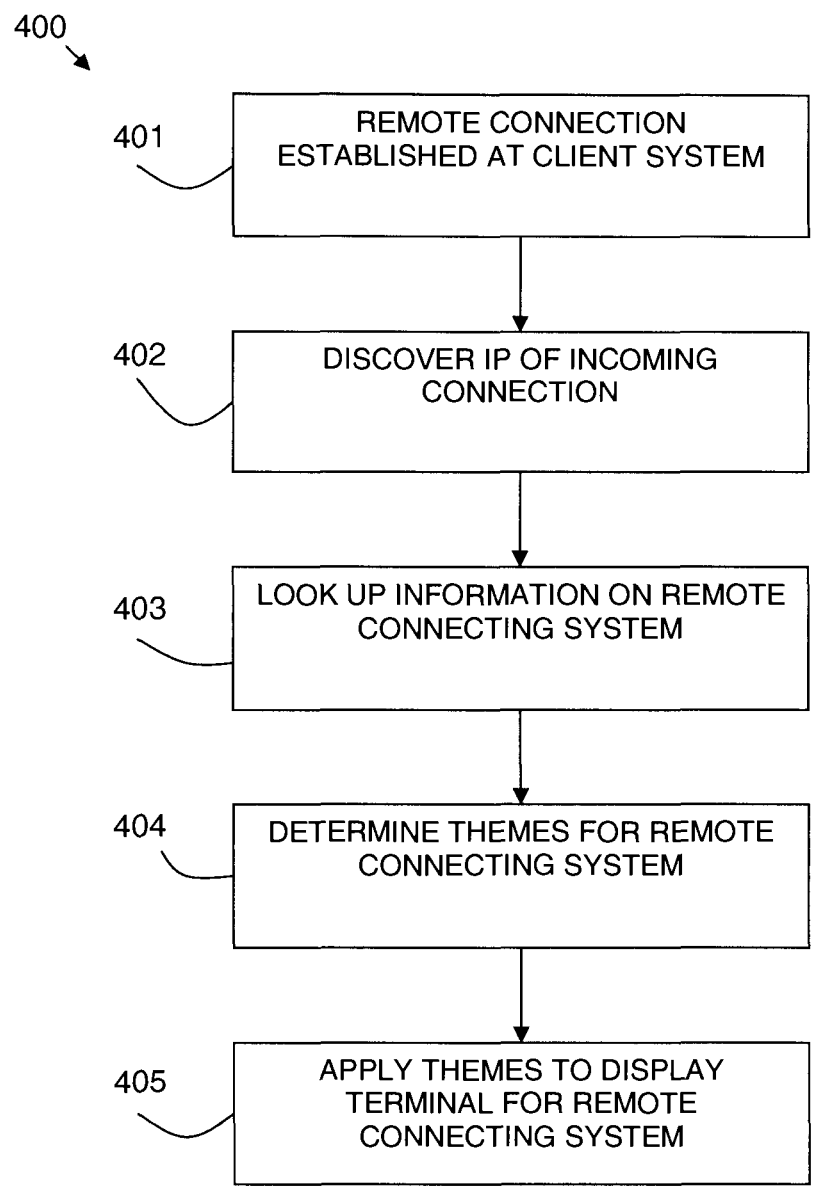
FIG. 4 is a flow diagram of a process of applying a theme to a remote application in accordance with the present invention.

FIG. 4 is a flow diagram showing the process of establishing a theme for a connecting application 400.

A remote connection is established 401 at a client system. The theme manager discovers 402 the IP of the connection. The theme manager looks up 403 information on the remote connecting system. The theme manager determines 404 themes for the configuration of the remote connecting system. The theme manager applies 405 the themes to the user interface object for the remote connecting system.

A user may create or modify themes by launching remote component and then selecting the theme manager option from window menu which launches the theme manager. The theme manager acquires information on the current component, for example, application name, application path (location in the file system it was launched from), host IP, title bar text, etc.

Using existing groups (if present), the theme manager categorises the current component if it can, and pre-fills the theme options from the default theme, applying any group themes that currently exist.

From the theme manager the user can create a new group based on any available information and wildcards.

For example:

Menu→create new group» group name is kde_apps group matching is done on the application name, where appname=k*.

Menu→add to group» select existing group » add based on (application name/application host IP or subnet/application title bar text) adds the current application to an existing group definition.

With a group selected, a panel displays the current override values. Using menus any available theme property can be selected for inclusion in this group and modified to the desired value.

The theme manager shows each group that the component is part of. Each group can be assigned a hierarchy value to move it up/down the list of groups. The resultant theme values considering all overrides, is displayed to view the effect of overrides based on the current groups and their order.

An apply button is used to view the effects of any changes on the current component.

In summary, a remote session being used at a client system can be identified via the user interface object being visibly altered, for example, by colour, font, title bar graphics, etc. This enables the user to have instant feedback as to which component is a test, live, staging, etc.

As a session logs onto different remote systems, based on the system's pre-configured usage, the session alters itself to give instant feedback to let the user know what tasks he should or should not do on that remote system. The client session may formalize this, for example, in terms of seeking double confirmation of execution of irreversible actions. The implementation could also be extended to ordering favourites and the presentation of the GUI options to suit the remote system.

The embodiments of the invention are described in terms of a window user interface object at a client system for an application running on a remote system. The user interface object may be any form of appropriate display and is not limited to window objects. Also, the user interface object may represent any component accessed on a remote system, including data, documents, services, etc. as well as applications.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

The invention claimed is:

1. A method for distinguishing user interface objects that represent remote interfaces on a client system comprising:
    establishing a connection at the client system to a remote system to access a remote operational component on the remote system;
    providing a user interface object at the client system that represents an interface to the remote operational component on the remote system; and
    applying a graphical theme to the user interface object, the graphical theme distinguishing the user interface object as representing the interface to the remote operational component.

2. The method of claim 1, further comprising applying a graphical theme to user interface objects at the client system for components local to the client system, where graphical themes for the local and remote components are distinguished.

3. The method of claim 1, where the graphical theme distinguishing the user interface object as representing the interface to the remote operational component represents: one or more remote systems, a type of remote system, a type of component on a remote system, a type of operating system, a sub-network of remote systems, or a physical location of a remote system.

4. The method of claim 1, where the graphical theme has a plurality of aspects and each aspect represents a feature of a component.

5. The method of claim 1, where the graphical theme has a hierarchy of aspects representing features of a component.

6. The method of claim 5, where a group of components have a common graphical theme in the form of a color applied to the user interface object and an individual component is represented by a shade of the color.

7. The method of claim 1, where the user interface object is a window object.

8. The method of claim 1, further comprising determining details of the connection to the remote system and determining the graphical theme based on the determined details of the connection to the remote system.

9. The method of claim 1, where the remote operational component on the remote system comprises one of an application, a database system, and a service.

10. The method of claim 1, where the graphical theme comprises control features based on a type of the remote operational component on the remote system.

11. A system for distinguishing user interface objects that represent remote interfaces on a client system comprising:
    a client system having a graphical user interface;
    a connection means at the client system to access a remote operational component on a remote system;
    the graphical user interface of the client system comprising a user interface object that represents an interface to the remote operational component on the remote system; and
    means for applying a graphical theme to the user interface object, the graphical theme distinguishing the user interface object as representing the interface to the remote operational component.

12. The system of claim 11, where the graphical user interface comprises user interface objects for components local to the client system, where the means for applying a graphical theme applies distinguishing graphical themes to the local components and remote components.

13. The system of claim 11, where the graphical theme distinguishing the user interface object as representing the interface to the remote operational component represents: one or more remote systems, a type of remote system, a type of component on the remote system, a type of operating system, a sub-network of remote systems, or the physical location of a remote system.

14. The system of claim 11, where the means for applying the graphical theme comprises means for creating and modifying graphical themes.

15. The system of claim 11, where the means for applying the graphical theme comprises means for determining details of the connection to the remote system and means for determining the graphical theme based on the determined details of the connection to the remote system.

16. The system of claim 11, where the graphical theme has a plurality of aspects and each aspect represents a feature of a component.

17. The system of claim 11, where the graphical theme has a hierarchy of aspects representing features of a component.

18. The system of claim 17, where a group of components have a common graphical theme in the form of a color applied to the user interface object and an individual component is represented by a shade of the colour color.

19. The system of claim 11, where the graphical user interface is a window-based interface.

20. The system of claim 11, where the remote operational component on the remote system comprises one of an application, a database system, and a service.

21. The system of claim 11, where the graphical theme comprises control features based on a type of the remote operational component on the remote system.

22. A computer program product stored on a non-transitory computer readable storage medium, comprising computer readable program code means for performing the steps of: establishing a connection at a client system to a remote system to access a remote operational component on the remote system; providing a user interface object at the client system that represents an interface to the remote operational component on the remote system; and applying a graphical theme to the user interface object, the graphical theme distinguishing the user interface object as representing the interface to the remote operational component.

* * * * *